(No Model.)
C. E. CHINNOCK.
Manufacture of Electrical Conductors.
No. 242,813. Patented June 14, 1881.
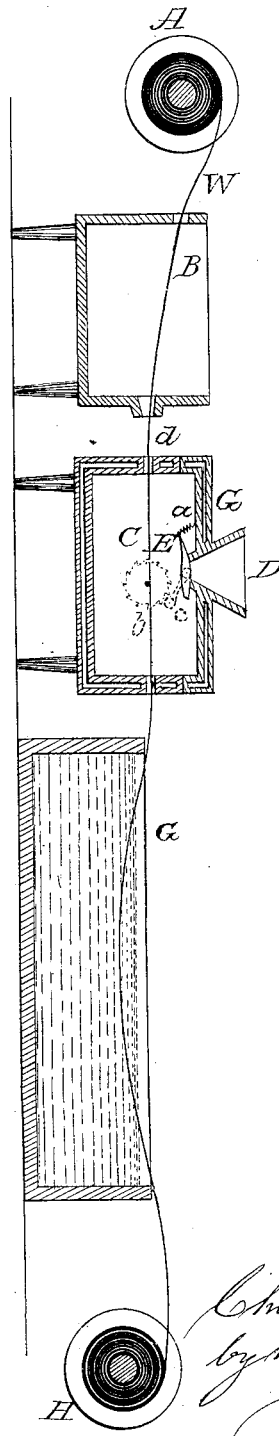
Witnesses:
Fredk Haynes
Thomas E. Birch
Inventor:
Charles E Chinnock
by his Attorneys
Brown & Brown

UNITED STATES PATENT OFFICE.

CHARLES E. CHINNOCK, OF BROOKLYN, NEW YORK, ASSIGNOR TO THE CHINNOCK ELECTRIC COMPANY.

MANUFACTURE OF ELECTRICAL CONDUCTORS.

SPECIFICATION forming part of Letters Patent No. 242,813, dated June 14, 1881.

Application filed May 18, 1880. (No model.)

*To all whom it may concern:*

Be it known that I, CHARLES E. CHINNOCK, of Brooklyn, in Kings county and State of New York, have invented certain new and useful Improvements in the Manufacture of Electrical Conductors, of which the following is a specification.

My invention relates to the manufacture of electrical conductors of the kind which are provided with insulating coverings and external casings of electric conducting material for intercepting and carrying off induced and escaping currents of electricity, so as to preclude them from interfering with messages sought to be transmitted through the conductors.

The object of my invention is to facilitate and cheapen the manufacture of such conductors, and to improve the efficiency of the same.

To this end my invention consists in a novel process of applying to a wire or electrical conductor an insulating covering and an external metallic casing—namely, in moving it longitudinally, a portion at a time, to means whereby a coating of paraffine wax or other mastic insulating material is applied to it; in simultaneously, by said longitudinal movement, subjecting another portion having insulating material applied to it, to means whereby there is deposited on it plumbago or other like material, and in simultaneously, by said longitudinal movement, subjecting a portion having plumbago or other like materal applied to it to a galvanic bath for electroplating it with copper or other metal, whereby I produce an electrical conductor which is very cheap and durable, and in which the evaporation of the insulating material and the entrance of water to it are effectually precluded.

In carrying out this process I pass the conductor through a box or vessel containing paraffine or other mastic insulating material in a partially-melted state, and thence through a die which regulates the amount of insulating material on the conductor. Subsequently I pass the conductor through a heated box or vessel, where the insulating material is partially melted and plumbago or like materal is deposited on it; and, finally, I pass the conductor through an electroplating-bath. Thus the manufacture of the electrical conductors may be carried on continuously and cheaply.

The accompanying drawing represents a central longitudinal section of an apparatus for use in carrying out my process.

A designates a reel, upon which the wire W, for forming an electrical conductor, is wound, and from which it is payed out under any desirable tension.

B designates a box or vessel containing paraffine wax or other wax or mastic substance kept by heat or otherwise in proper condition to adhere to the wire W as it moves lengthwise through the same. At the exit-opening in this box or vessel is a die, $d$, whereby the insulating material adhering to the wire W is reduced to a uniform thickness throughout the length of the wire.

C designates a closed chamber, heated by any suitable means—as for instance, by steam circulating in a jacket, $C'$—and through which the wire W, with its insulating material, passes. The insulating material is somewhat softened by the heat in passing through the box or chamber, and meanwhile plumbago or like material is deposited upon it. This may be done by providing the box or chamber with a hopper, D, containing the said material, and having a shaking bottom, E, impelled in one direction by a spring, $a$, and impelled intermittently in the other direction by the teeth of a wheel, such as a trip-hammer wheel, $b$, acting upon a lever, $c$, affixed to the said bottom. The wire next passes to an electroplating-bath, G, and is allowed to sag into the same without scraping over the edges so as to endanger the removal of the plumbago or like material. During its passage through the electroplating-bath it has deposited on it a coating of copper, and then is wound upon a reel, H, ready for use. In this manner I produce an electrical conductor having a very desirable insulating-covering and an external casing of electric conducting material of very superior kind, in that while it is cheap it is very durable and slow in corroding, and prevents the evaporation of the insulating-covering or the passage of water to it.

It will be seen that my process is continuous and adapted for the manufacturing of conductors of any length, the said conductors being coated, a portion at a time, first with insulating material, then with plumbago, and finally with copper or other metal.

What I claim as my invention, and desire to secure by Letters Patent, is—

1. The process of applying to a wire or electrical conductor an insulating covering and an external metallic casing, consisting in moving it longitudinally, a portion at a time, to means whereby a coating of paraffine-wax or other mastic insulating material is applied to it, in simultaneously by said longitudinal movement subjecting another portion, having insulating material applied to it, to means whereby there is deposited on it plumbago or other like material, and in simultaneously by said longitudinal movement subjecting a portion having plumbago or other like material applied to it to a galvanic bath for electroplating it with copper or other metal, substantially as specified.

2. The combination, with a box or vessel containing paraffine or other mastic insulating material, and provided with a die, a box or chamber provided with means for heating the insulating material and depositing thereon plumbago or like material, and an electroplating-bath, of means for drawing an electrical conductor through the same, substantially as specified.

CHAS. E. CHINNOCK.

Witnesses:
T. J. KEANE,
E. P. JESSUP.